United States Patent
Volpi et al.

(10) Patent No.: US 8,301,503 B2
(45) Date of Patent: Oct. 30, 2012

(54) SYSTEM AND METHOD FOR PROVIDING REQUESTED INFORMATION TO THIN CLIENTS

(75) Inventors: John P. Volpi, Garland, TX (US); Matthew N. Bowers, Dallas, TX (US); Kelly A. Hartley, Dallas, TX (US); Steven H. Roemerman, Tulsa, OK (US); Jodi B. Rubin, Dallas, TX (US)

(73) Assignee: Incucomm, Inc., Richardson, TX (US)

( * ) Notice: Subject to any disclaimer, the term of this patent is extended or adjusted under 35 U.S.C. 154(b) by 821 days.

(21) Appl. No.: 10/197,065

(22) Filed: Jul. 17, 2002

(65) Prior Publication Data

US 2003/0018540 A1    Jan. 23, 2003

Related U.S. Application Data

(60) Provisional application No. 60/306,127, filed on Jul. 17, 2001.

(51) Int. Cl.
*G06O 30/00* (2006.01)
*G06F 17/00* (2006.01)
(52) U.S. Cl. .......................................... 705/26; 705/27
(58) Field of Classification Search ...................... 705/26
See application file for complete search history.

(56) References Cited

U.S. PATENT DOCUMENTS

| | | | |
|---|---|---|---|
| 4,839,853 A | | 6/1989 | Deerwester et al. |
| 5,278,980 A | | 1/1994 | Pedersen et al. |
| 5,950,173 A | * | 9/1999 | Perkowski .................... 705/27.1 |
| 5,978,773 A | * | 11/1999 | Hudetz et al. .................... 705/23 |
| 6,112,242 A | * | 8/2000 | Jois et al. ....................... 709/225 |
| 6,134,589 A | * | 10/2000 | Hultgren ....................... 709/227 |
| 6,463,430 B1 | * | 10/2002 | Brady et al. ........................... 1/1 |
| 6,509,913 B2 | * | 1/2003 | Martin et al. ................... 715/762 |
| 6,550,672 B1 | * | 4/2003 | Tracy et al. ..................... 235/383 |
| 6,574,624 B1 | * | 6/2003 | Johnson et al. ................ 707/750 |
| 6,589,093 B1 | * | 7/2003 | Morgan ......................... 446/177 |
| 6,681,383 B1 | * | 1/2004 | Pastor et al. ................... 717/126 |
| 6,772,170 B2 | | 8/2004 | Pennock et al. |
| 6,775,677 B1 | | 8/2004 | Ando et al. |
| 6,826,553 B1 | * | 11/2004 | DaCosta et al. ....................... 1/1 |
| 6,857,102 B1 | * | 2/2005 | Bickmore et al. ............. 715/205 |
| 6,931,292 B1 | | 8/2005 | Brumitt et al. |
| 7,086,065 B1 | * | 8/2006 | Yeluripati et al. ............. 719/311 |
| 7,120,585 B2 | | 10/2006 | Boulanov |
| 7,158,506 B2 | | 1/2007 | Jacobs et al. |
| 2001/0037197 A1 | | 11/2001 | Boulanov |
| 2002/0013948 A1 | * | 1/2002 | Aguayo et al. ................... 725/91 |

(Continued)

OTHER PUBLICATIONS

"Indexing by Latent Semantic" Analysis, Deerwester et al., Jan. 26, 2007.*

*Primary Examiner* — Garcia Ade
(74) *Attorney, Agent, or Firm* — Slater & Matsil, L.L.P.

(57) ABSTRACT

A system for, and method of, providing requested information to a client. In one embodiment, the system includes: (1) a core information database that contains core information gleaned from the Internet and restructured according to a predetermined taxonomy and (2) a client communications interface, coupled to the core information database, that receives a request message from a client containing a request for some of the core information, derives a database query from the request message, causes the some of the core information to be retrieved from the core information database, formats the some of the core information into a response message according to display limitations of the client and transmits the response message to the client for display thereby.

34 Claims, 5 Drawing Sheets

U.S. PATENT DOCUMENTS

| | | |
|---|---|---|
| 2002/0103799 A1 | 8/2002 | Bradford et al. |
| 2002/0103809 A1 | 8/2002 | Starzl et al. |
| 2002/0135618 A1* | 9/2002 | Maes et al. .................... 345/767 |
| 2003/0004942 A1 | 1/2003 | Bird |
| 2003/0046083 A1 | 3/2003 | Devinney et al. |
| 2003/0061039 A1 | 3/2003 | Levin |
| 2003/0078766 A1* | 4/2003 | Appelt et al. .................... 704/9 |
| 2003/0093334 A1 | 5/2003 | Barzilay |
| 2003/0216908 A1 | 11/2003 | Berestesky et al. |
| 2004/0059736 A1 | 3/2004 | Willse et al. |
| 2004/0064438 A1 | 4/2004 | Kostoff |
| 2004/0174900 A1 | 9/2004 | Volpi et al. |
| 2004/0176958 A1 | 9/2004 | Salmenkaita et al. |
| 2004/0203677 A1 | 10/2004 | Brown et al. |
| 2004/0210443 A1 | 10/2004 | Kuhn et al. |
| 2004/0220944 A1 | 11/2004 | Behrens et al. |
| 2005/0075985 A1 | 4/2005 | Cartmell |
| 2006/0114987 A1* | 6/2006 | Roman .................... 375/240.01 |
| 2006/0171402 A1 | 8/2006 | Moore et al. |

* cited by examiner

SYSTEM AND METHOD FOR PROVIDING REQUESTED INFORMATION TO THIN CLIENTS

CROSS-REFERENCE TO RELATED APPLICATION

The present application is based on Provisional Patent Application Ser. No. 60/306,127, filed on Jul. 17, 2001, by Volpi, et al., entitled "System and Method for Providing a Range of Information on Demand for a Commercial Item, Identifiable Subsystem, Commodity or Individual," commonly assigned with the present application and incorporated herein by reference.

TECHNICAL FIELD OF THE INVENTION

The present invention is directed, in general, to computer systems and, more specifically, to a system and method for providing requested information to thin clients.

BACKGROUND OF THE INVENTION

Presently, individuals seeking timely and relevant, decision quality product data are only able to get it by individually contacting providers of such products, physically traveling to multiple locations where the products are offered, scouring print advertising, and/or using the Internet. The Internet provides vast quantities of information, but requires some skill in fully using the present search capabilities. In addition, search results often overload the user with too much data while providing only limited viewing potential of a product. Physically visiting "brick-and-mortar" facilities allows the actual products to be viewed, but can be severely limiting in detailed specifications and alternative selections.

Recently, there has been much activity focused on enabling individuals to interface with the Internet via wireless devices in addition to wireline systems currently available. Wireless access can bring the power of the Internet to a user on a Wherever, Whenever, Whatever basis. While the concept is good, it is also fundamentally flawed, as the necessary limitations of wireless devices will only exacerbate the situation described above. This results in a substantial unmet need.

The systems presently in place, which connect the user directly with the Internet, are fundamentally flawed for several reasons. One reason is that the Internet, and many current data providers, have too much information. Users often find it difficult to find the specific desired items on the Internet because all of the information is there. For example, a simple query on an Internet browser can easily return several thousand responses. Advanced searches that are often used to reduce the number to a manageable level are time consuming, non-standard, difficult to use without considerable practice, and tend to be more art than science. In addition, none of this searching is compatible with spontaneous interaction and is aggravated when the interface medium is a mobile device connected by wireless means because of the bandwidth limiting nature of mobile wireless devices. Accessing the Internet through a mobile wireless device is analogous to the information traversing through "thin pipes."

Another reason is that even though the information needed is on the Internet or in product and manufacturer databases, the information is only useful when it is easily accessible, compatible with the capabilities (e.g., bandwidth) of the connection, compatible with the mobile device (e.g., Palm OS and others), accurate, and easily understandable by the user. Typically, searches on present systems, which only provide access to the Internet, result in the user getting a large amount of raw data. More recent systems do little more than provide a cross correlation table to existing URL pages and do not address the heart of the problem.

For example, a personal digital assistant (PDA) cannot view a web page that is normally intended for a conventional office computer system. One obvious reason is that the screen on the FDA cannot display as much information as on an office computer system. Also, typical search results can span hundreds of pages and each result can be wider than what can be displayed on a PDA. Another problem associated with a PDA is the size of the keyboard. PDA keyboards may not have a full keyboard and, as such, are harder to use. However, the need is no less, and may be greater as an individual in a non-office environment where there are fewer resources available. In this situation, the individual would have to rely mostly on what the single mobile device can effectively provide. Current systems don't effectively allow users of PDAs to find information while providing output consistent with the capabilities of the PDAs.

Similar needs beyond those for inanimate products also exist for individuals. These needs are exemplified by, but not limited to medical records, insurance records, financial records and similar items. The needs for individuals can also be extended to agricultural items including livestock.

Correlation and quality of the data retrieved is not obvious nor is it uniform and little effort is made to make it so. Simply saying "It is on the Web" or "It is in a database" is not enough. Just setting up a direct relationship with the Internet is insufficient and can actually add to a confusing situation as it is prone to cause far too much unsorted, unqualified and often incomprehensible data and options to descend upon the user and his limited handheld terminal, causing delay, extraneous data, information deluge, and overload. The result is a frustrated user without the necessary information needed to perform a task.

Accordingly, what is needed in the art is a system to effectively provide quality information in a timely manner through a bandwidth limited transport path.

SUMMARY OF THE INVENTION

To address the above-discussed deficiencies of the prior art, the present invention provides a system for, and method of, providing requested information to a client. In one embodiment, the system includes: (1) a core information database that contains core information gleaned from the Internet and restructured according to a predetermined taxonomy and (2) a client communications interface, coupled to the core information database, that receives a request message from a client containing a request for some of the core information, derives a database query from the request message, causes the some of the core information to be retrieved from the core information database, formats the some of the core information into a response message according to display limitations of the client and transmits the response message to the client for display thereby.

The present invention therefore introduces the broad concept of an Internet intermediary that contains information selectively drawn from the Internet and intelligently organized and that interacts with clients to receive and grant requests for information in their native format. The present invention advantageously avoids the problems encountered when seeking pertinent information from the Internet, particularly when such seeking is performed with a thin, wireless client with limited display capability.

In one embodiment of the present invention, the client is selected from the group consisting of: (1) a wireless personal data assistant, (2) a cell telephone with display messaging capability, (3) a computer, (4) a supply chain system and (5) a wired messaging terminal. Thus, the present invention is employable with a wide variety of clients. These and any other conceivable conventional or later-discovered client fall within the broad scope of the present invention.

In one embodiment of the present invention, the system forms a part of a product purchasing system, the core information regards a plurality of products available for purchase and the predetermined taxonomy calls for the core information to be organized by model, source, price and availability. This e-commerce application, along with others, will be illustrated and described in the Detailed Description that follows.

In one embodiment of the present invention, the client is selected from the group consisting of: (1) a wireless personal data assistant, (2) a cell telephone with display messaging capability, (3) a computer, (4) a supply chain system and (5) a wired messaging terminal. Thus, the present invention is employable with a wide variety of clients. These and any other conceivable conventional or later-discovered clients fall within the broad scope of the present invention.

In one embodiment of the present invention, the request message is a natural language text message. Alternatively, the request may be embedded in a more computer-recognizable form, such as an XML datagram.

In one embodiment of the present invention, the system further includes a search engine that, if the request is for information outside of the core information database, causes a search of the Internet to be performed in an effort to obtain further core information for inclusion in the core information database. In a more specific embodiment, the search engine comprises a web crawler. Thus, if a request goes unfulfilled, the system can advantageously make an effort to find the needed information on the Internet and filter, organize and store the information for later delivery to the client.

In one embodiment of the present invention, the system further includes a configuration database containing the display limitations along with display limitations of other clients. Thus, the system may have client-specific display limitation information for each of its clients, allowing the system to customize the format in which it is to deliver the information.

In one embodiment of the present invention, the client communications interface obtains a client type from the client and employs the client type to determine the display limitations of the client. Thus, the system can dynamically format responses specifically to the display characteristics of each client using the system without requiring a user to specifically indicate the type of client being used.

In one embodiment of the present invention, the client communications interface subsequently prompts the client for refining request messages. The refining requests may be for more information, pricing, related products or orders. Of course, the present invention is not limited to a particular type of refining request.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes as the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
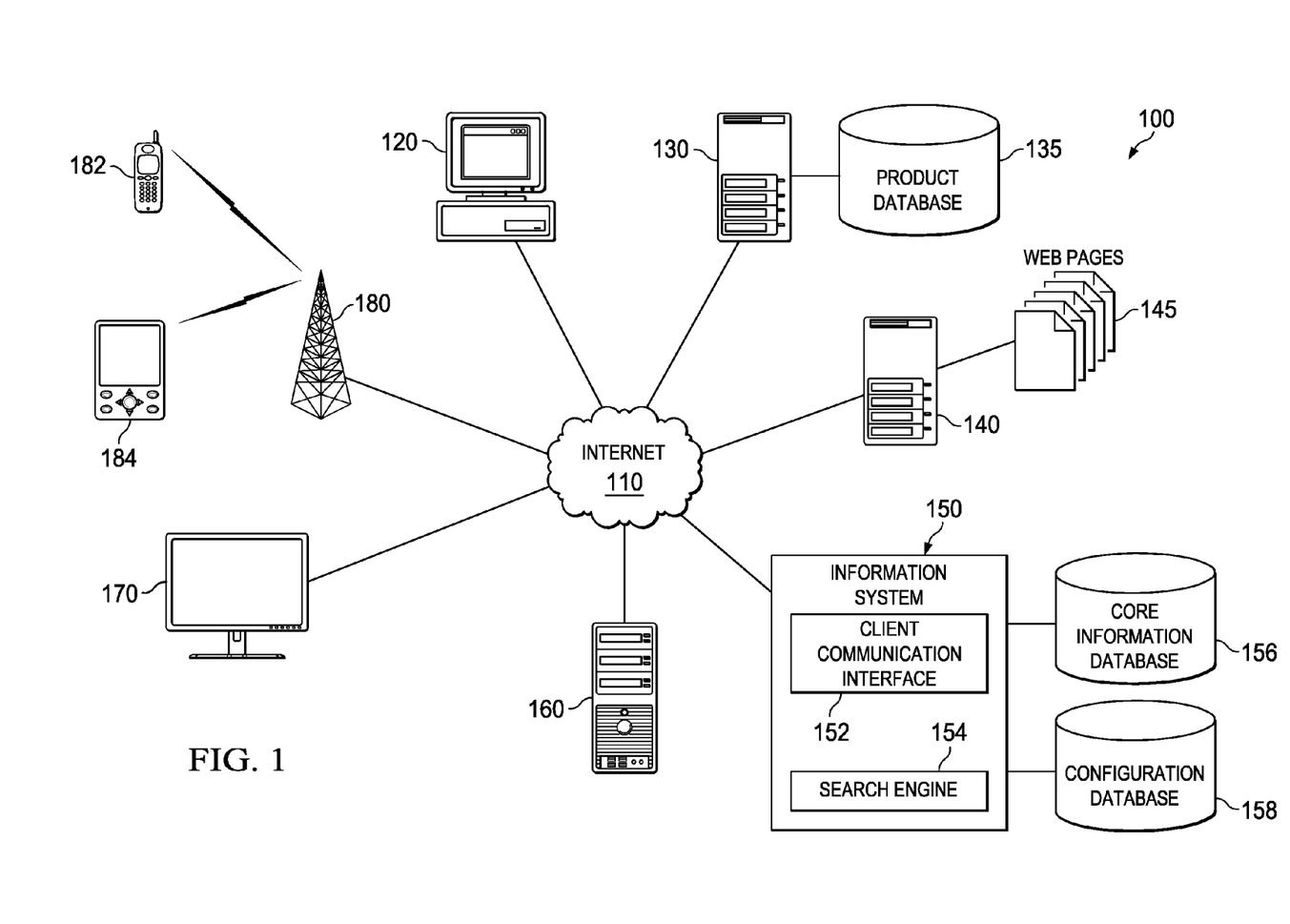
FIG. 1 illustrates a block diagram of an embodiment of a communication network for providing requested information to a client constructed in accordance with the principles of the present invention.

Referring initially to FIG. 1, illustrated is a block diagram of an embodiment of a communication network, generally designated 100, for providing requested information to a client constructed in accordance with the principles of the present invention. The communications network 100 includes the Internet 110 and a product database server 130 coupled to the Internet 110. The product database server 130 may be a conventional database server and includes a product database 135 that contains information for one or more vendor products or services. The product database server 130 provides information concerning products from the product database 135 via queries from a conventional web browser or from Exchange Markup Language (XML) queries. The communications network 100 also includes a conventional network server 140 coupled to the Internet 100. The network server 140 provides access to programs and a series of Web pages 145. The network server 140 may also host several Web sites for vendors of products, services or information. In other embodiments, the communications network 100 may have any number of product database servers 130 having any number of product databases 135, and any number of network servers 140 having any number of Web pages 145.

Within the environment of the computer network 100 is a personal computer system 120, a supply chain system 160, and a wired messaging terminal 170, all coupled to the Internet. The personal computer system 120 may be a conventional computer system having the capability to access and search the Internet 110. The personal computer system 120 may also include a conventional Internet browser. The supply chain system 160 may include one or more computer systems configured to provide software services and data for a chain of suppliers of products or services. The wired messaging terminal 170 may be a conventional messaging terminal capable of sending and receiving messages via the Internet. The computer network 100 may also include a cell telephone with display messaging capability 182 and a wireless personal data assistant (PDA) 184 coupled to the Internet via a transmitter 180.

The computer network 100 also provides an environment for the present invention to operate. Included in the computer network 100 is an information system 150 that provides requested information to a client. The information system 150 may be a network server or a plurality of servers coupled to the Internet. The client may be selected from the group consisting of the wireless PDA 184, the cell telephone with display messaging capability 182, personal computer system 120, the supply chain system 160, and the wired messaging terminal 170. The information system 150 includes a core information database 156 that contains core information gleaned from the Internet 110 and restructured according to a predetermined taxonomy.

The predetermined taxonomy may include classifications such as computers, networking, electronics, software, medical products, medical procedures, medical history, agricultural products, financial information, and commodities. The core information contained in the core information database 156 may also include model information, specifications, detailed descriptions, source of suppliers, pricing, availability, and other information for the information gleaned from the Internet 110. Of course, however, the present invention is not limited to the classifications and types of information listed above, and are just examples of the type of information contained in the core information database 156. Other embodiments of the present invention may use different taxonomy, include additional and/or different classifications, and additional and/or different information gleaned for each classification.

The information system 150 also includes a client communication interface 152. The client communication interface 152 may be embodied in hardware, software, firmware or a combination thereof. In one embodiment, the client communication interface 152 may be an application service provider. The client communication interface 152 is configured to receive a request message from a client that contains a request for some of the core information in the core information database 156. In one embodiment, the request message is a natural language text message. For example, the natural language text message may be "Who makes digital cameras with 2.1 MegaPixel resolution?"

The client communication interface 152 is further configured to derive a database query from the request message and cause some of the core information to be retrieved from the core information database 156. If the request message was the above natural language text message example, the derived database query would request a comparison across all of the camera vendors in the core information database 156 for the given criteria. In another embodiment, the core information database 156 is further configured to allow the client communication interface 152 to obtain comparisons between at least a portion of the core information in a given classification of the predetermined taxonomy with which the core information is associated with. In yet another embodiment, the client communication interface 152 can obtain comparison across all of the core information contained in the core information database 156.

The client communication interface 152 is also configured to format the retrieved core information into a response message according display limitations of the client and transmit the response message to the client for display on the client's display. In one embodiment, the client communication interface 152 may obtain a client type from the client and employ the client type to determine the display limitations of the client. For example, the wireless PDA 184 may send a client type via the Internet 110 indicating that it is a PDA, such as Palm Pilot® or Blackberry®, the client communication interface 152 would format the response to accommodate the display of the PDA and the limited bandwidth of the wireless connection (also called a thin client). Thus, the information system 150 may have client-specific display limitation information for each of its clients, allowing the system to customize the format in which it is to deliver the information.

The client communication interface 152 may also employ a configuration database 158 in determining the display limitations for the client. The configuration database 158 may contain the display limitations for each client and/or type of client along with their display limitations. In another embodiment, the client communication interface 152 may employ the configuration database 158 to obtain a profile for the client. The client communication interface 152 may cause some of the core information to be retrieved from the core information database 156 in accordance with the obtained client profile. Thus, a client may receive only information to which it is entitled, or which it prefers.

After sending the response message to the client, the client communication interface 152 may prompt the client for refining the request message. For example, if the response message (results of the request message) did not provide the desired information or if the client would like to ask for related information, the client communication interface 152 allows the client to refine or change the request message. See FIGS. 2-6 for an example of refining request messages.

In the illustrated embodiment, the information system 150 may also contain a search engine 154. The search engine 154, in one embodiment, searches the product database server 130 and the network server 140 for core information based on the predetermined taxonomy and gleams the found core information. The gleaned core information is then restructured and stored in the core information database 156. In another embodiment, the search engine 154 may be a web crawler. If a client sent a request message for information that is outside of the core information contained in the core information database 156, the search engine 154 may cause a search of the Internet to be performed in an effort to obtain further core information associated with the requested information for inclusion in the core information database 156.

In a related embodiment, the client communication interface 152 may also be configured to ask the client to rate the value of the information in the response message. For example, the client could rate the information from 1 to 10, where 1 is less helpful and 10 is most helpful. The search engine 154 would maintain a database of the information requested and the corresponding ratings. If a request for particular type of information was rated low, the search engine would bump up the priority of that particular type of information and cause a search of the Internet to be performed to obtain more core information concerning that type of information for inclusion in the core information database 156.

Figure 2:
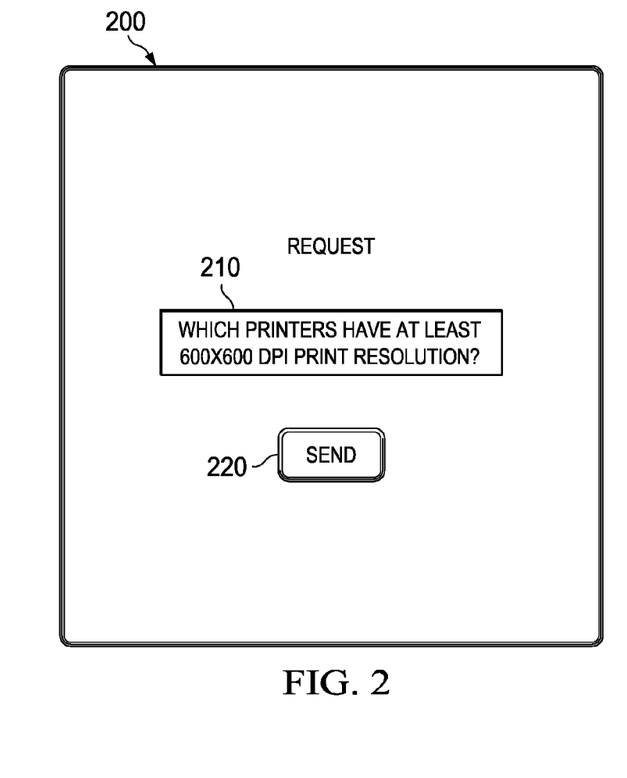
FIG. 2 illustrates an exemplary request display of a thin client constructed in accordance with the principles of the present invention.

Turning now to FIG. 2, illustrated is an exemplary request display of a thin client constructed in accordance with the principles of the present invention. As previously described, a thin client is a device that has limited communication bandwidth, such as mobile wireless communication devices similar to the wireless PDA 184 and the cell telephone with display messaging capability 182 of FIG. 1. A thin client typically also has limited display capabilities. For example, a wireless PDA may only be able to display 10 rows of 40 characters each. Of course, however, the principles illustrated for a thin client can be used on any type of client having a standard bandwidth or broadband connection to the Internet.

FIG. 2 and subsequent FIGS. 3-6 illustrate examples of a thin client submitting request messages requesting information from a core information database, such as the core information database 156 of FIG. 1, receiving responses and refining and/or requesting more specific information from the core information database. Illustrated in FIG. 2 is a display 200 of a thin client. The display 200 includes a request field 210 for a user to enter a request message to obtain some core information from the core information database. In the illustrated embodiment, the request field can accept a natural language text message. In this example, the user entered a natural language text message of "WHICH PRINTERS HAVE AT LEAST 600×600 DPI PRINT RESOLUTION."

Once the user has entered the desired request message, the user would then press a send button 220 to send the request message. The request message may be sent to a client information interface similar to the client information interface 152 of FIG. 1 for processing. A database query is derived from the request message and executed on the core information database. The results are then obtained and sent back the display 200. See FIG. 3 for an example of the results. The present invention, however, is not limited to the display arrangement nor to the fields illustrated in FIG. 2.

Figure 3:
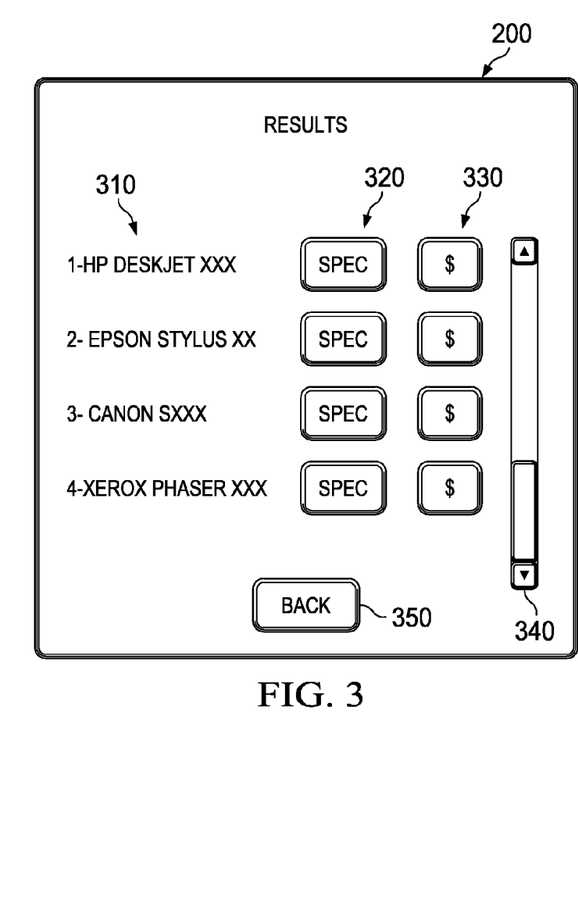
FIG. 3 illustrates an exemplary results display of a thin client constructed in accordance with the principles of the present invention.

Turning now to FIG. 3, illustrated is an exemplary results display of a thin client constructed in accordance with the principles of the present invention. The display 200 illustrates exemplary results 310 to the request message sent in FIG. 2 and formatted to accommodate the display limitations of the thin client. The results 310 include the manufacturer and model of each printer matching the criteria specified in the request message. Each field of the results 310 may also include a specification button 320 and a price button 330. The specification button 320 allows the user to obtain the specification of a particular printer. The price button 330 allows the user to obtain prices from various vendors for that particular printer. Of course, however, the results 310, specification button 320 and the price button 330 may be used for any type of produce or service.

The display 200 also includes a scrollbar 340 to allow the user to scroll through the remaining portions of the results 310 if needed. The display also includes a back, button 350 that allows the user to go back to the previous page. Thus, the present invention advantageously provides a history capability.

In this example we will assume the user desires to view the specification for the HP DESKJET XXX. The user would then press the specification button 320 next to the result entry for the HP DESKJET XXX. The thin client would then send a message request requesting the specification. A database query is derived win the request message and executed on the core information database to obtain the specification for the HP DESKJET XXX. The results are then obtained, formatted according to the display limitations of the client and sent back the display 200. See FIG. 4 for an example of the results. The present invention, however, is not limited to the display arrangement nor to the fields illustrated in FIG. 3. In another embodiment, the user may request different types of information associated with the result entry, such as a summary or technical information.

Figure 4:
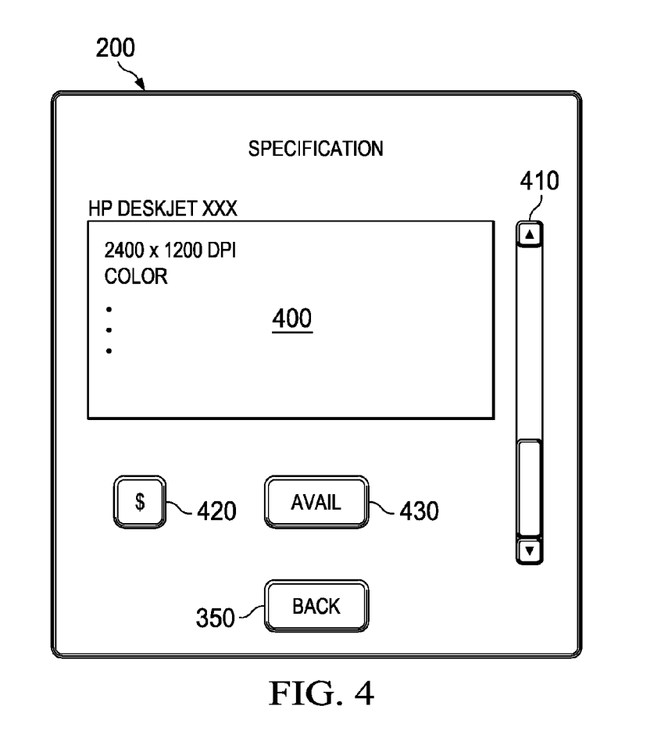
FIG. 4 illustrates an exemplary specification display of a thin client constructed in accordance with the principles of the present invention.

Turning now to FIG. 4, illustrated is an exemplary specification display of a thin client constructed in accordance with the principles of the present invention. The display 200 illustrates an exemplary specification result 400 for the request message for the specification sent in FIG. 3. The specification result 400 illustrates an example of a specification for a HP DESKJET XXX. The display 200 also includes a scrollbar 410 to allow the user to scroll through the results 400. In the illustrated example, the display 200 also includes a price button 420 and an availability button 430. The price button 420 allows the user to obtain prices from various vendors for the product associated with the specification. The availability button 430 allows the user to obtain the availability of the product from various vendors.

In this example we will assume the user desires to view the prices for the HP DESKJET XXX. The user would then press the price button 420 on the display 200. The thin client would then send a message request requesting a comparison of prices from various vendors. A database query is derived from the request message and executed on the core information database to obtain the prices for the HP DESKJET XXX from vendors that carry that product. The results are then obtained, formatted according to the display limitations of the client and sent back the display 200. See FIG. 5 for an example of the results. The present invention, however, is not limited to display arrangement nor to the fields illustrated in FIG. 5.

Figure 5:
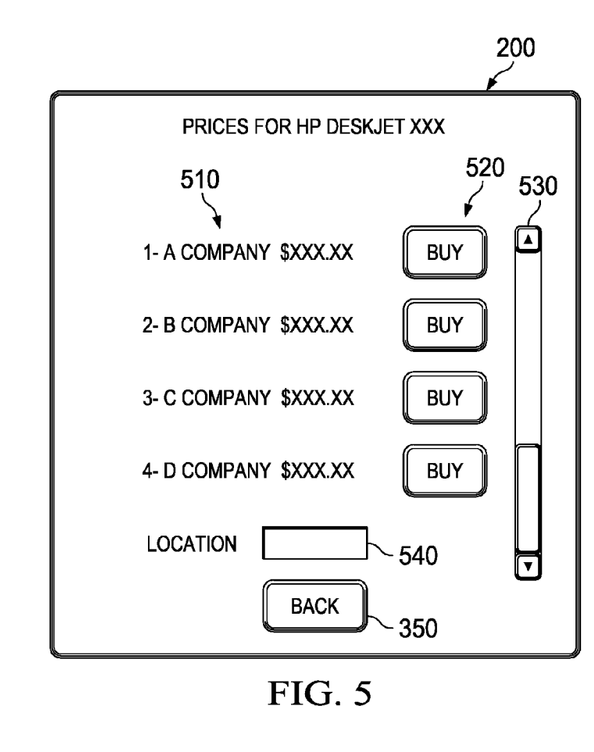
FIG. 5 illustrates an exemplary prices display of a thin client constructed in accordance with the principles of the present invention.

Turning now to FIG. 5, illustrated is an exemplary prices display of a thin client constructed in accordance with the principles of the present invention. The display 200 illustrates an exemplary prices 510 for the request message for the prices sent in FIG. 4. The prices 510 illustrates an example of prices from various vendors for a HP DESKJET XXX contained in the core information database. The prices 510 include the vendor and that vendor's price. Each field of the prices 510 may also include a buy button 520 that allows the user to purchase that product from that particular vendor. The display 200 also includes a scroll bar 530 that allows the user to scroll through the prices 510. In addition, the display 200 may also include a location sorting field 540. The location sorting field 540 allows a user to enter criteria to limit the display of prices of the selected product from the various vendors. For example, the user may enter a zip code to limit the results to vendors within a geographic area. Of course, other limiting criteria are well within the broad scope of the present invention. In addition, the present invention is not limited to the display arrangement nor to the fields illustrated in FIG. 5.

Figure 6:
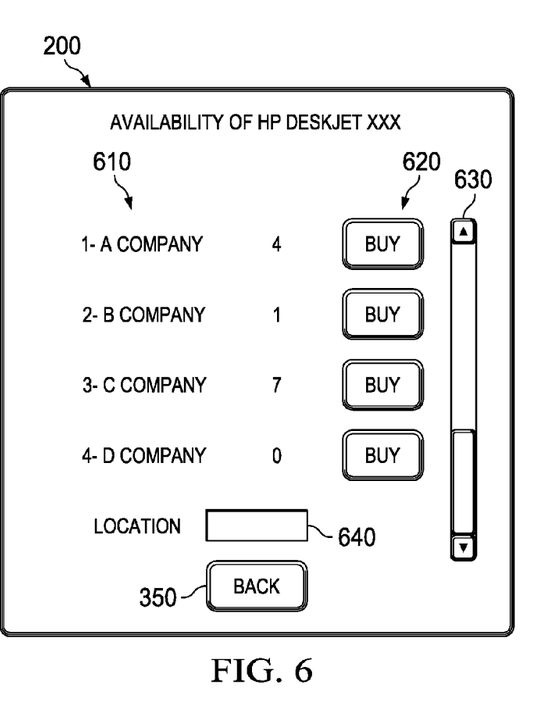
FIG. 6 illustrates an exemplary availability display of a thin client constructed in accordance with the principles of the present invention.

Turning now to FIG. 6, illustrated is an exemplary availability display of a thin client constructed in accordance with the principles of the present invention. If the user pressed the availability button 430 in FIG. 4, the thin client would send a request message for the availability of the HP DESKJET XXX and the results would be sent back to the thin client. The display 200 illustrates an example of availability results 610. The availability results 610 contain a vendor and an available quantity for that vendor. Each field of the availability results 610 also includes a buy button 620 that allows the user to purchase that product from that particular vendor. The display 200 also includes a scroll bar 630 that allows the user to scroll through the availability results 610. In addition, the display 200 may also include a location sorting field 640. The location sorting field 640 allows a user to enter criteria to limit the display of the availability of the selected product from the various vendors. For example, the user may enter a zip code to limit the results to vendors within a geographic area. Of course, other limiting criteria are well within the broad scope of the present invention. In addition, the present invention is not limited to the display arrangement nor to the fields illustrated in FIG. 6.

Figure 7:
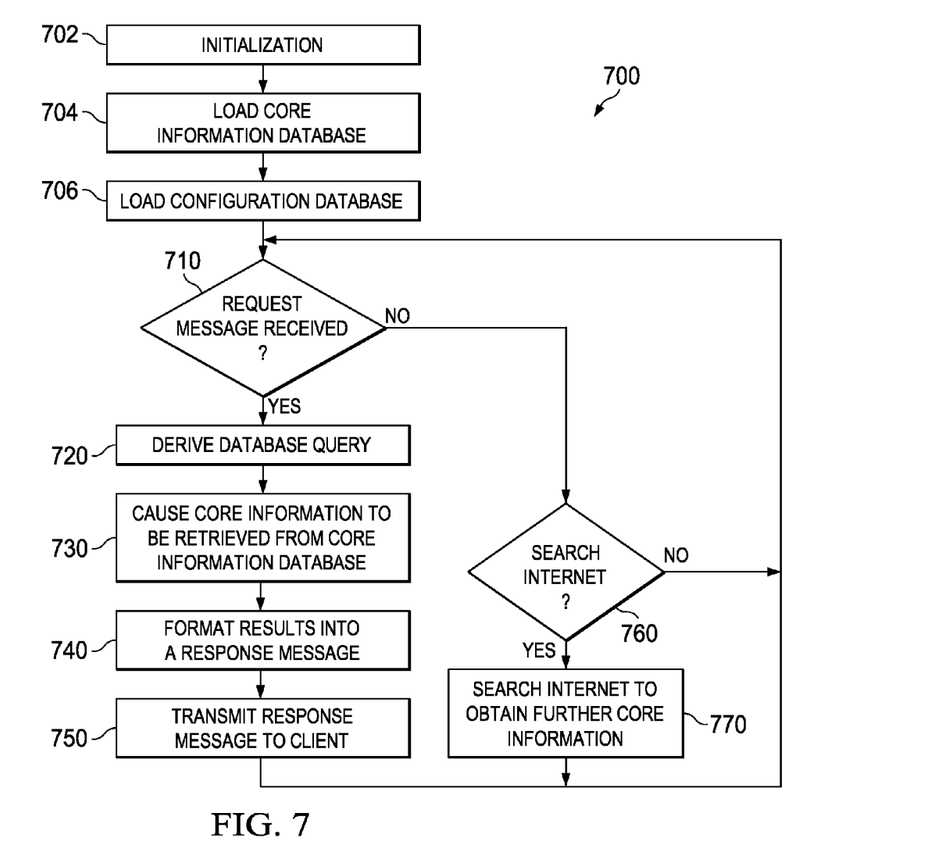
FIG. 7 illustrates a flow diagram of an embodiment of a method of providing requested information to a client conducted according to the principles of the present invention.

Turning now to FIG. 7, illustrated is a flow diagram of an embodiment of a method, generally designated 700, of providing requested information to a client, such as a thin client conducted according to the principles of the present invention. In FIG. 7, the method 700 first performs initialization in a step 702.

After initialization, the method 700 loads a core information database with core information gleaned from the Internet and restructured according to a predetermined taxonomy in a step 704. In one embodiment, the method 700 may be employed to purchase products. In this embodiment, the core information regards a plurality of products available for purchase and the predetermined taxonomy would call for the core information to be organized by model, source, price and availability.

The method 700 may optionally load a configuration database in a step 706. In one embodiment the configuration database would contain display limitations for each client that would be employing the method 700. In another embodiment, the configuration database may contain a client profile that may be employed to cause some of the core information to be retrieved from the core information database according to a profile associated with the client. A client may be selected from the group consisting of a wireless PDA, a cell telephone with display messaging capability, a computer, a supply chain system, and a wired messaging terminal. Of course, however, other types of clients may be employed by the present invention.

Next, the method 700 determines if a request message was received from a client containing a request for some of the core information in the core information database in a decisional step 710. If the method 700 received a request message, the method 700 then derives a database query from the request message in a step 720. In one embodiment, the request message may be a natural language text message. In other embodiments, the request message may be any type of request from the client to perform some action or function.

The method 700 then employs the database query to cause some of the core information to be retrieved from the core information database in a step 730. Next, the method 700 formats the core information that was received into a response message according to display limitations of the client in a step 740. The display limitations may include the display size, color capabilities, number of pixels of the display, the number of rows and characters per row, formatting codes, and bandwidth requirements. The method 700 may employ the optional configuration database to obtain the display limitations for that client. In another embodiment, the method 700 may obtain a client type from the client and employ the client type to determine the display limitations for that client. Next, the method 700 transmits the response message to the client for display in a step 750. The method 700 then returns to determine if it has received another request message in the decisional step 710.

If the request message was not received in the decisional step 710, the method 700 then determines if a search of the Internet is to be performed in a decisional step 760. If no search is to be performed, the method 700 returns to determine if it has received another request message in the decisional step 710. If a search is to be performed, the method 700 causes a search of the Internet to be performed in an effort to obtain further core information for inclusion in the core information database in a step 770. The search may be in response to a request message which contains a request for information that is outside of the core information database. In another embodiment, the search may be performed at predetermined times or in a background mode in order to update the core information according to the predetermined taxonomy. The search may be performed by a web crawler or other. Internet routines capable of examining and obtaining formation from devices connected to the Internet. The method 700 then returns to determine if it has received another request message in the decisional step 710.

One skilled in the art should know that the present invention is not limited to receiving and processing a request message, and performing a search of the Internet. The present invention and method may also perform multiple functions at the same time. Also, other embodiments of the present invention may have additional or fewer steps than described above.

While the methods disclosed herein have been described and shown with reference to particular steps performed in a particular order, it will be understood that these steps may be combined, subdivided, or reordered to form an equivalent method without departing from the teachings of the present invention. Accordingly, unless specifically indicated herein, the order and/or the grouping of the steps are not limitations of the present invention.

Although the present invention has been described in detail, those skilled in the art should understand that they can make various changes, substitutions and alterations herein without departing from the spirit and scope of the invention in its broadest form.

What is claimed is:

1. A system for providing requested information to a thin client having display limitations and couplable to a bandwidth limited transport path, comprising:
   a core information database including memory and configured to contain core information gleaned from an Internet and restructured according to a predetermined taxonomy; and
   a client communications interface, operable with a processor and coupled to said core information database, configured to receive a request message from said thin client through said bandwidth limited transport path containing a request for some of said core information, derive a database query from said request message, cause said some of said core information to be retrieved from said core information database, dynamically format said some of said core information into a response message according to said display limitations of said thin client and transmit said response message to said thin client through said bandwidth limited transport path for display thereby, wherein said response message includes a request for a non-monetary rating of a value of said some of said core information therein from said thin client.

2. The system as recited in claim 1 wherein said thin client is selected from the group consisting of:
   a wireless personal data assistant,
   a cell telephone with display messaging capability,
   a computer with limited communication bandwidth and display capability,
   a supply chain system with limited communication bandwidth and display capability, and
   a wired messaging terminal with limited communication bandwidth and display capability.

3. The system as recited in claim 1 wherein said system forms a part of a product purchasing system, said core information regards a plurality of products available for purchase and said predetermined taxonomy calls for said core information to be organized by model, source, price and availability.

4. The system as recited in claim 1 wherein said core information database is further configured to allow said client communications interface to obtain comparisons between at least a portion of said core information in a given classification of said predetermined taxonomy with which said core information is associated.

5. The system as recited in claim 1 wherein said request message is a natural language text message.

6. The system as recited in claim 1 further comprising a search engine that, if said request is for information outside of said core information database, is configured to cause a search of the Internet to be performed in an effort to obtain further core information for inclusion in said core information database.

7. The system as recited in claim 1 wherein said client communications interface is configured to cause said some of said core information to be retrieved from said core information database in accordance with a profile of said thin client.

8. The system as recited in claim 1 further comprising a configuration database configured to contain said display limitations along with display limitations of other clients, wherein said display limitations include at least one of display size, color capabilities of said display, number of pixels of said display, number of rows and characters per row of said display, and formatting codes associated with said display.

9. The system as recited in claim 1 wherein said client communications interface is configured to obtain a client type from said thin client and is configured to employ said client type to determine said display limitations of said thin client.

10. The system as recited in claim 1 wherein said client communications interface is configured to subsequently prompt said thin client for refining request messages.

11. A method of providing requested information to a thin client having display limitations and couplable to a bandwidth limited transport path, comprising:
    loading a core information database with core information gleaned from an Internet and restructured according to a predetermined taxonomy;
    receiving a request message at a server from said thin client through said bandwidth limited transport path containing a request for some of said core information;
    deriving a database query with said server from said request message;
    causing said some of said core information to be retrieved from said core information database with said server;
    dynamically formatting said some of said core information into a response message with said server according to display limitations of said thin client; and
    transmitting said response message to said thin client through said bandwidth limited transport path for display thereby, wherein said response message includes a request for a non-monetary rating of a value of said some of said core information therein from said thin client.

12. The method as recited in claim 11 wherein said thin client is selected from the group consisting of:
    a wireless personal data assistant,
    a cell telephone with display messaging capability,
    a computer with limited communication bandwidth and display capability,
    a supply chain system with limited communication bandwidth and display capability, and
    a wired messaging terminal with limited communication bandwidth and display capability.

13. The method as recited in claim 11 wherein said method is carried out to purchase products, said core information regards a plurality of products available for purchase and said predetermined taxonomy calls for said core information to be organized by model, source, price and availability.

14. The method as recited in claim 11 wherein said core information database is also configured to allow said database query to obtain comparisons between at least a portion of said core information in a given classification of said predetermined taxonomy with which said core information is associated.

15. The method as recited in claim 11 wherein said request message is a natural language text message.

16. The method as recited in claim 11 further comprising causing a search of the Internet to be performed in an effort to obtain further core information for inclusion in said core information database if said request is for information outside of said core information database.

17. The method as recited in claim 11 wherein said causing said some of said core information to be retrieved from said core information database is performed in accordance with a profile of said thin client.

18. The method as recited in claim 11 further comprising loading a configuration database with said display limitations along with display limitations of other clients, wherein said display limitations include at least one of display size, color capabilities of said display, number of pixels of said display, number of rows and characters per row of said display, and formatting codes associated with said display.

19. The method as recited in claim 11 wherein said formatting further comprises obtaining a client type from said thin client and employing said client type to determine said display limitations of said thin client.

20. The method as recited in claim 11 further comprising subsequently prompting said thin client for refining request messages.

21. A system for providing requested information to a client having display limitations and couplable to a bandwidth limited transport path, comprising:
    a core information database including memory and configured to contain core information gleaned from an Internet and restructured according to a predetermined taxonomy; and
    a client communications interface, operable with a processor and coupled to said core information database, configured to receive a request message from a client through said bandwidth limited transport path containing a request for some of said core information, obtain a client type from said client, employ said client type to determine said display limitations of said client, derive a database query from said request message, cause said some of said core information to be retrieved from said core information database, format said some of said core information into a response message according to said display limitations of said client and transmit said response message to said client through said bandwidth limited transport path for display thereby without modifying a display configuration of said client, wherein said response message includes a request for a non-monetary rating of a value of said some of said core information therein from said client.

22. The system as recited in claim 21 wherein said system forms a part of a product purchasing system, said core information regards a plurality of products available for purchase and said predetermined taxonomy calls for said core information to be organized by model, source, price and availability.

23. The system as recited in claim 21 wherein said core information database is further configured to allow said client communications interface to obtain comparisons between at least a portion of said core information in a given classification of said predetermined taxonomy with which said core information is associated.

24. The system as recited in claim 21 further comprising a search engine that, if said request is for information outside of said core information database, is configured to cause a search of the Internet to be performed in an effort to obtain further core information for inclusion in said core information database.

25. The system as recited in claim 21 further comprising a configuration database configured to contain said display limitations along with display limitations of other clients and a profile of said client.

26. A method of providing requested information to a client having display limitations and couplable to a bandwidth limited transport path, comprising:
   loading a core information database with core information gleaned from an Internet and restructured according to a predetermined taxonomy;
   receiving a request message at a server from a client through said bandwidth limited transport path containing a request for some of said core information;
   obtaining a client type at said server from said client;
   employing said client type to determine said display limitations of said client with said server;
   deriving a database query with said server from said request message;
   causing said some of said core information to be retrieved from said core information database with said server;
   formatting said some of said core information into a response message with said server according to display limitations of said client; and
   transmitting said response message to said client through said bandwidth limited transport path for display thereby without modifying a display configuration of said client, wherein said response message includes a request for a non-monetary rating of a value of said some of said core information therein from said client.

27. The method as recited in claim 26 wherein said method is carried out to purchase products, said core information regards a plurality of products available for purchase and said predetermined taxonomy calls for said core information to be organized by model, source, price and availability.

28. The method as recited in claim 26 wherein said core information database is further configured to allow said database query to obtain comparisons between at least a portion of said core information in a given classification of said predetermined taxonomy with which said core information is associated.

29. The method as recited in claim 26 further comprising causing a search of the Internet to be performed in an effort to obtain further core information for inclusion in said core information database if said request is for information outside of said core information database.

30. The method as recited in claim 26 further comprising loading a configuration database with said display limitations along with display limitations of other clients and a profile of said client.

31. The system as recited in claim 1 wherein said client communications interface is configured to receive said non-monetary rating of said value of said some of said core information from said thin client.

32. The system as recited in claim 1 further comprising a search engine that, if said non-monetary rating of said value of said some of said core information is low, is configured to cause a search of the Internet to be performed in an effort to obtain further core information for inclusion in said core information database.

33. The method as recited in claim 11 further comprising receiving said non-monetary rating of said value of said some of said core information from said thin client.

34. The method as recited in claim 11 further comprising causing a search of the Internet to be performed in an effort to obtain further core information for inclusion in said core information database if said non-monetary rating of said value of said some of said core information is low.

* * * * *